United States Patent
Kimball et al.

(10) Patent No.: US 7,085,234 B2
(45) Date of Patent: Aug. 1, 2006

(54) METHOD AND APPARATUS FOR AUTOMATIC LOAD-BALANCING ON MULTISEGMENT DEVICES

(75) Inventors: Karen E. Kimball, Sacramento, CA (US); Robert L. Faulk, Jr., Roseville, CA (US); Robert M. McGuire, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 10/038,579

(22) Filed: Jan. 8, 2002

(65) Prior Publication Data

US 2002/0126622 A1    Sep. 12, 2002

Related U.S. Application Data

(62) Division of application No. 08/738,940, filed on Oct. 24, 1996, now Pat. No. 6,345,041.

(51) Int. Cl.
*H04L 12/26* (2006.01)
*H04L 12/56* (2006.01)
*G01R 31/08* (2006.01)

(52) U.S. Cl. ............... 370/235; 370/252; 370/401; 370/465; 709/234; 709/250; 718/105

(58) Field of Classification Search ........... 370/229, 370/230, 231, 235, 236, 252, 253, 389, 400, 370/401, 407, 408, 425, 428, 463, 465, 468; 709/223, 224, 225, 226, 232, 234, 235, 250; 718/105

See application file for complete search history.

(56) References Cited

U.S. PATENT DOCUMENTS 4,621,359 A * 11/1986 McMillen .................. 370/235
5,053,950 A * 10/1991 Naganuma et al. ......... 718/105

(Continued)

FOREIGN PATENT DOCUMENTS

| EP | 0 460 843 | 12/1991 |
| EP | 0460843 A2 | 12/1991 |
| EP | 0460849 A2 | 12/1991 |
| EP | 0 615 362 | 9/1994 |

(Continued)

OTHER PUBLICATIONS

Compex FreedomSwitch, WEB Page and Technical Overview (http://www.cpx.com/switch.htm).

(Continued)

*Primary Examiner*—Alpus H. Hsu

(57) ABSTRACT

Automatic load-balancing provides a decision-making process that includes intelligent automatic detection of when a given load-balancing activation currently would not be beneficial, thereby keeping the user's network from being unnecessarily disturbed when no real benefit would be gained; a process to undo a prior load-balancing that can be activated when users have accidentally selected a feature which could substantially change their network configurations; and an extensive intelligent port-distribution algorithm that improves the network load by moving the right ports to new segments.

84 Claims, 5 Drawing Sheets

U.S. PATENT DOCUMENTS

| | | | |
|---|---|---|---|
| 5,432,907 A | | 7/1995 | Picazo, Jr. et al. |
| 5,495,426 A | * | 2/1996 | Waclawsky et al. ........ 709/226 |
| 5,742,587 A | | 4/1998 | Zornig |
| 5,978,844 A | * | 11/1999 | Tsuchiya et al. ............ 709/221 |
| 6,151,326 A | * | 11/2000 | McGuire et al. ............ 370/402 |
| 6,393,483 B1 | * | 5/2002 | Latif et al. .................. 709/226 |
| 6,567,377 B1 | * | 5/2003 | Vepa et al. .................. 370/230 |
| 6,578,068 B1 | * | 6/2003 | Bowman-Amuah ......... 709/203 |
| 6,581,104 B1 | * | 6/2003 | Bereiter ...................... 709/232 |
| 2003/0074467 A1 | * | 4/2003 | Oblak et al. ................ 709/238 |

FOREIGN PATENT DOCUMENTS

| | | |
|---|---|---|
| EP | 0675616 A2 | 4/1995 |
| EP | 0675616 A3 | 4/1995 |
| WO | WO 92/21191 | 11/1992 |

OTHER PUBLICATIONS

European Search Report dated Feb. 16, 2006 in European Patent Application No. 02080440.

* cited by examiner

METHOD AND APPARATUS FOR AUTOMATIC LOAD-BALANCING ON MULTISEGMENT DEVICES

CROSS REFERENCE TO RELATED APPLICATION

This application is a divisional of application Ser. No. 08/738,940, filed Oct. 24, 1996, now U.S. Pat. No. 6,345,041, which is incorporated herein by reference.

BACKGROUND OF THE INVENTION

1. Technical Field

The invention relates to electronic communications networks. More particularly, the invention relates to the automatic configuration of hardware and software networking products for network segmentation to balance the flow of communications and data between nodes on such networks.

2. Description of the Prior Art

A network segment consists of repeaters, end stations, and connectivity between the stations (for example, see standard ISO/IEC 8802-3 for information on Ethernet networks). A set of predefined rules for communicating, called "protocols," determines how and when end-nodes on the network segment are allowed to communicate with one another, and what form such communication takes.

In a data communications network, data are transferred in the form of packets which contain the address of the sending station (the source address) and the address of the intended recipient (the destination address). The exact packet format, and the predefined rules for interpreting the contents of such packets, are again specific to the network type and are made up of several levels of protocols. As described herein, a network segment has the capacity to transfer a limited amount of data per second. When more than the maximum media speed of network data transfer capacity is required, multiple segments can be used. These segments can be interconnected through the use of bridges or other packet-forwarding devices, which allow communication between different segments (bridges are defined in standard ISO/IEC 10038).

The term switch has recently been applied to bridges. Switches are fast bridges which generally do not use a CPU to process the packets. Bridges contain two or more ports, each of which connects to a segment. When two stations on different segments communicate with each other, the bridge forwards the packets between the two segments. When the stations are on the same segment, the bridge does not forward the packets to any other segment. The bridge may buffer data received on its ports to allow forwarding of the data later onto a different segment that was busy when the transmission first occurred.

Over time, a network may grow as more users (end-nodes) are added. Each of these new end-nodes must then compete with existing end-nodes for access to the network. As the number of end-nodes which might potentially access the network medium grows, it becomes statistically more likely that the medium is in use when a given end-node wants to transmit, thereby requiring the end-node to wait. In addition, available network resources may be constrained when just a few end-nodes have heavy resource impact. Nodes which transmit a lot of packets, which transmit a lot of broadcast or multicast packets (received by all or many stations), or which create a lot of network disruptions (e.g., collisions, late collisions, etc.), consume a lot of the available network resources, leaving less for other end-nodes.

Thus, schemes which increase the amount of network resources available (i.e. the amount of potential accessibility to the network medium), without changing the type of physical network used (preserving the users' investment), are of great use and interest.

When the network medium is shared (as opposed to switched), one way of increasing the amount of available network resources is to split the shared medium into multiple segments (i.e., segment the network). This limits the number of users who have access to any one of these segments. If it is desired to have end-nodes in a segment communicate with end-nodes in other segments, bridging or switching or routing across the segments may be employed, so that network packets for devices that are not in the immediate segment are forwarded until they reach the segment of the destination end-node.

While segmenting the network medium can improve resource availability, the choice of where to segment, e.g., which nodes should be assigned to which segment, affects the success of the results. If all of the nodes which impact network resources the most remain on the same segment, access for any one of those nodes is not much improved by this scheme, while the less resource-impacting nodes on other segments have greatly increased opportunity for access but far less need of it. In this situation, the increased resources are wasted on the wrong end-nodes.

Additionally, network systems are inherently complex. A significant amount of technical education is required to understand, configure, and maintain any particular type of physical network, e.g. 10Base-T, Ethernet, Token Ring, or FDDI networks. As the use of networks becomes widespread, the number of users responsible for such networks grows, while those among them who have sufficient knowledge to accomplish these tasks declines. Thus, schemes which can configure, maintain, or improve network conditions without requiring much specific knowledge on the part of the user are also of great use and interest. Such ease-of-use, i.e. user-friendly, schemes are often encompassed in software which is either embedded in network devices or external to them. These software applications generally are known as intelligent network agents.

One network products vendor is presently marketing a 10Base-T network switch that allows any of its ports to be assigned to any one of four internal backplane segments. The product is described as having a load-balancing feature which can be activated in one of several ways:

On-demand by the user (i.e. a manual trigger);
At a designated time or interval; or
When a user-defined threshold is reached (this is a threshold of a network value defined in the product's Management Information Base (MIB) and configured via the Simple Network Management Protocol (SNMP). For example, the MIB value could be a collision count, a segment utilization pattern, or a switch utilization pattern.

These mechanisms for triggering such actions are not new. The first two have existed in practice for some time, and the third is an aspect of recent implementations of the Remote MONitoring (RMON) suite of features. The algorithms that are actually used by the product's load-balancing feature to determine which ports to place on which of the four internal backplane segments have been informally described as being based on end-node communication patterns gleaned from address-pair information in the switch's address table. Thus, this approach requires that the switching fabric and intelligent network agent components are fully integrated into the intelligent agent's hardware environment.

Accordingly, the state of the art provides an automatic load-balancing solution that does not accommodate an inability on the part of the user or agent to communicate with the switching fabric (e.g., packet-forwarding, address table, etc.) hardware. This arrangement has a major disadvantage in that it is unusable with switches and other packet-forwarding devices which are fully external to the intelligent agent's hardware environment. It would therefore be advantageous to provide an agent that can intelligently improve network resource availability, without requiring special, integrated packet-forwarding hardware.

In addition, the prior method may result in unnecessary load-balancing. It would therefore be advantageous to reduce network disruption by performing such load-balancing only when it actually improves network resource availability.

Furthermore, it is advantageous to provide an agent that can intelligently improve network resource availability while requiring only a simple activate action on the part of the user, such that no further action or special knowledge of the agent, its environment, or networks in general (such as how to set a threshold level, or even which threshold values would be meaningful) is required on the part of the user.

SUMMARY OF THE INVENTION

The invention provides an intelligent network agent that implements a feature referred to as automatic load-balancing. The invention addresses both of the major issues of network resource impact and ease-of-use described above, and intelligently improves network throughput, while requiring only a simple activate action on the part of the user such that no further action or special knowledge of the agent, its environment, or networks in general is required on the part of the user. The invention is designed to minimize network disruption by load-balancing only when it actually improves the network resource availability. Furthermore, because of the ability to use this invention in environments where packet-forwarding support hardware is external to the agent's environment, the invention works in situations where prior inventions do not, including cases where an external switch or other packet-forwarding device is manufactured by another vendor.

The automatic load-balancing method and apparatus further comprises three major components:

A decision-making process for automatically determining when a given load-balancing activation currently would not be beneficial;

An intelligent load-balancing port-distribution algorithm for assigning ports to segments; and A feature which allows undoing a prior load-balancing.

One goal for an intelligent feature of any sort involves determining when to actually implement the feature. The herein disclosed automatic load-balancing invention checks for situations in which a given automatic load-balancing activation should not occur by weighing the potential benefit of the action against its consequences, and by making an intelligent decision for the user while preventing needless network disruption.

Automatic load-balancing moves end-nodes (or groups of end-nodes) after the system has been running to increase the overall throughput of the network. This aspect of the invention redistributes hub ports to segments with the goal of evenly balancing resource load across all of the known segments. Past history is used to anticipate the future load, i.e. history since either activation of the intelligent agent or since the last time the load-balancing feature itself was activated.

The feature to undo a prior load-balancing takes information stored at a prior load-balancing activation and uses it to return ports to the previous configuration.

DETAILED DESCRIPTION OF THE INVENTION

Figure 1:
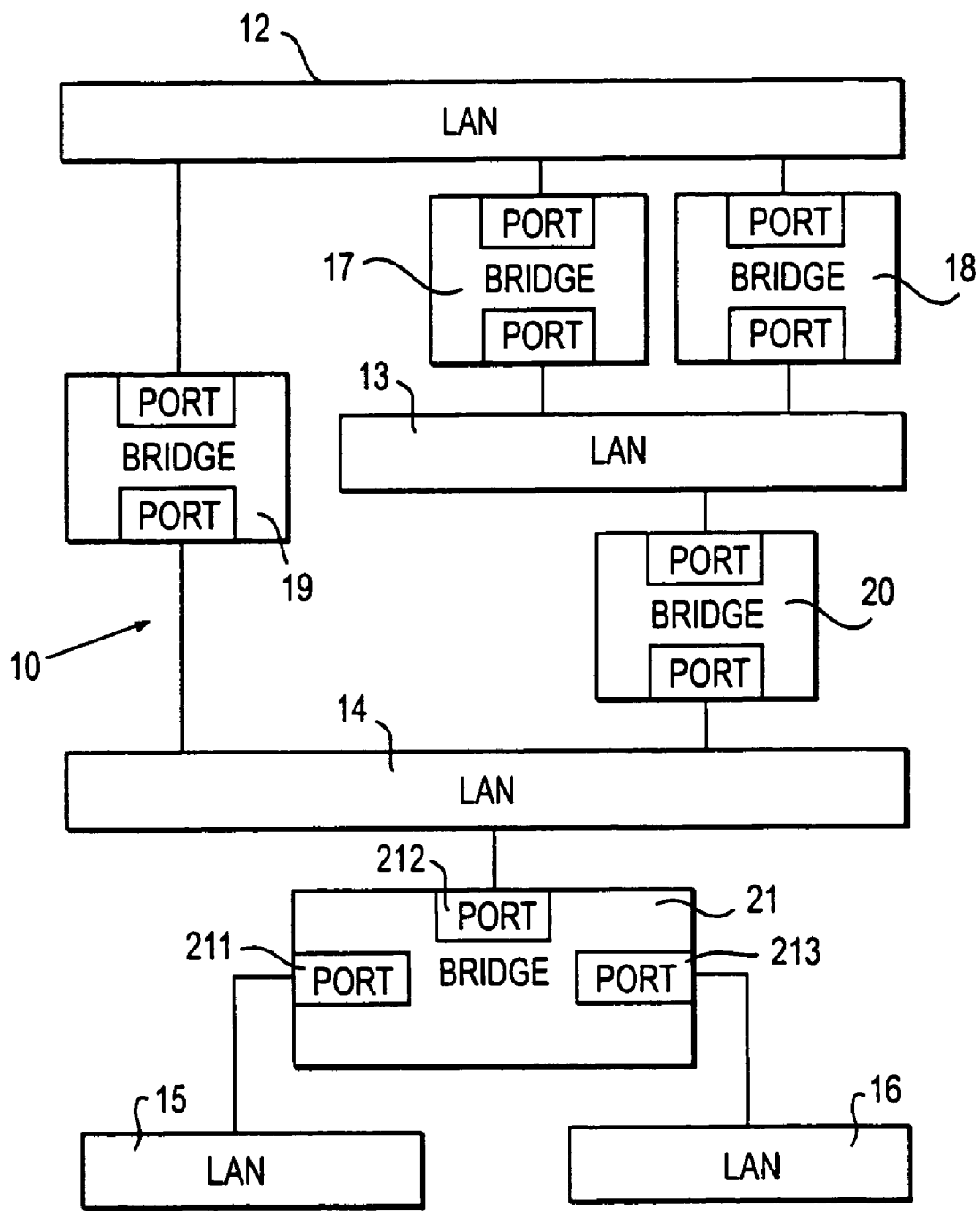
FIG. 1 is a block schematic diagram of an electronic communications network.

FIG. 1 is a block schematic representation of a typical electronic communications network, such as an Ethernet network. The network 10 consists of several Local Area Networks (LANs) 12–16, each of which is interconnected through a number of bridges 17–21. Each LAN is connected to one or more bridges. Connection between a LAN and a bridge is through a port. For example, ports 211, 212, 213 are shown in connection with the bridge 21. The principle functions of the bridge are to relay and filter data frames, maintain the information required to make frame filtering and relaying decisions, and management of the foregoing operations. Although the preferred embodiment of the invention is discussed in connection with an Ethernet network, the invention can readily operate with networks other than Ethernet networks. In fact, the invention herein described can apply at least to FDDI, as well as any of the networks specified in the IEEE 802 family of networking standards (e.g. 802.3 and 802.5).

The invention relates to the automatic configuration of hardware and software networking products for network segmentation, e.g. with regard to balancing the flow of communications and data between nodes on network segments to obtain more throughput on the network. Such automatic configuration off-loads responsibility for the management of the network and network devices from the system administrator, thereby saving time and training. Automatic configuration as disclosed herein refers to a decision made by the load balancing system including, potentially, an out-of-the-box first plug-in decision, and any adjustment to the network devices after the network system is in use (e.g. a "find new load-distribution," "set daytime config," or a "set off-hours config" decision).

Figure 2:
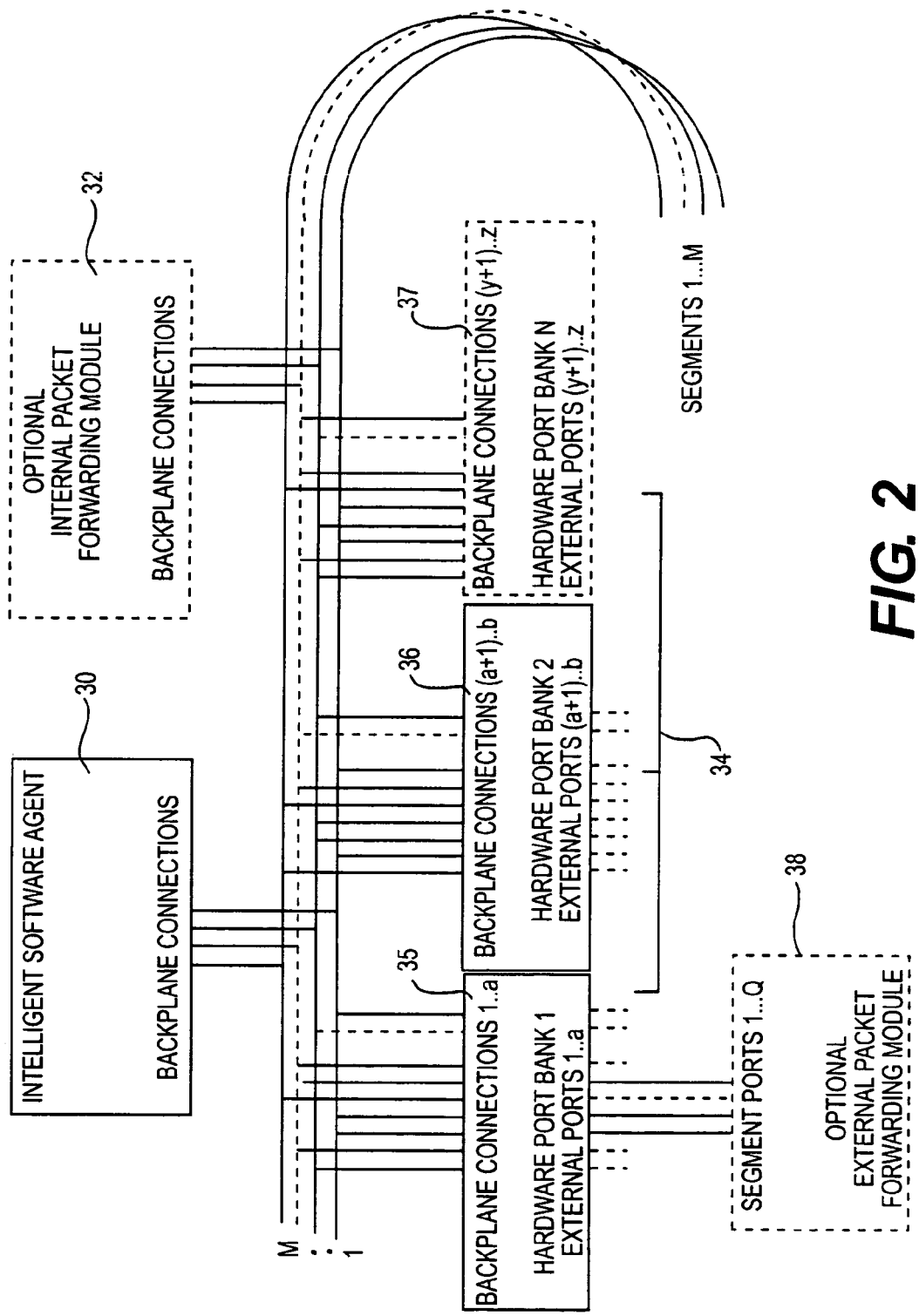
FIG. 2 is a block schematic diagram of a preferred hardware environment according to the invention.

FIG. 2 is a block schematic diagram of a preferred hardware environment according to the invention. The hardware environment consists of a network hub 34 (or connected stack of hubs 35, 36, 37), a network management card 30 which contains the processor and firmware required for the intelligent network agent features described herein, and an optional internal packet-forwarding module 32 or external packet-forwarding module 38 required to maintain communication across all four of the hub stack's internal segments 1 . . . M.

The preferred packet-forwarding module 32 is integrated into the system only insofar as the module itself can be detected by the intelligent network agent 30. The hub 34 (or connected stack of hubs 35, 36, 37) has backplane connections 1 . . . a, (a+1) . . . b, (y+1) . . . z which link the external ports 1 . . . a, (a+1) . . . b, (y+1) . . . z to any one of the hub stack's backplane segments 1 . . . M. The agent and the packet-forwarding module's backplane connections tie directly into the hub stack's backplane segments 1 . . . M in the preferred embodiment of the invention. Other implementations of the invention can be applied wherein a fully external packet forwarding module 38 connects to external hub ports, e.g. 1 . . . a, of which each hub port lies on a different backplane segment 1 . . . Q. These other implementations merely require information to be given to the intelligent agent, noting which ports on which of the devices in the agent's hardware environment are connected to the packet-forwarding device(s). That information could be provided by other internal or external software mechanisms (e.g. management application topology information, messaging from a management application, or an automatic switch detection module internal to the agent), or by user input (e.g. configuration via a simple management interface).

In the presently preferred embodiment of the invention, the packet forwarding module 32 is not tightly integrated into the system, in that the intelligent agent cannot control or communicate with the module's switching fabric (e.g. packet-forwarding or address table) hardware. Thus, the herein-disclosed automatic load-balancing method and apparatus preferably accommodates the inability of a system user or the intelligent network agent to communicate with the packet-forwarding support hardware. This feature of the invention provides at least one major advantage over prior art approaches in that the invention is also usable with switches and other packet-forwarding devices which are fully external to the intelligent agent's hardware environment (including switches, bridges, or routers made by other vendors), or which are not manageable by users, such as network administrators. The invention may also be used with an external software application rather than inside an embedded software agent.

Figure 3:
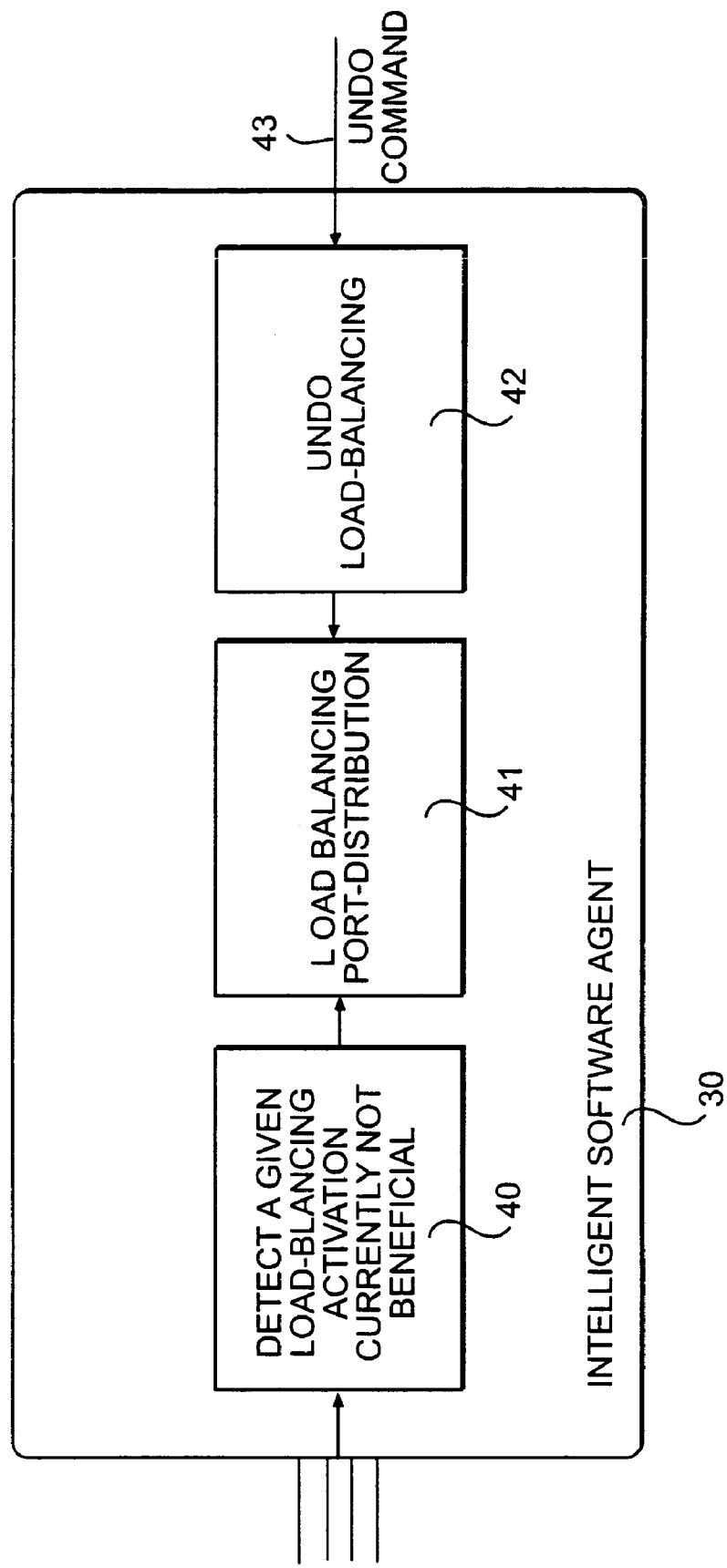
FIG. 3 is a block schematic diagram of an apparatus for automatic load balancing on segmented devices according to the invention.

FIG. 3 is a block schematic diagram of an apparatus for automatic load balancing on segmented devices according to the invention. The automatic load-balancing method and apparatus further comprise three major components:

A decision-making process 40 for automatically detecting when a given load-balancing activation currently would not be beneficial;

An intelligent load-balancing port-distribution algorithm 41 for assigning ports to segments; and An undo prior load-balancing feature 42 responsive to an undo command 43 issued by a user.

For network communications between all nodes to be preserved, a means for forwarding packets between the segments (e.g. a bridge, a switch or a router) must be present and enabled for the automatic load-balancing feature to be useful for the user.

Automatic Determination of when a Given Load-Balancing Activation would not be Beneficial One goal for an intelligent feature of any sort involves determining when to actually implement the feature. The herein disclosed automatic load-balancing invention checks for situations in which a given automatic load-balancing activation should not occur. Such situations include, for example, when the current load distribution is already good enough or when current network resource impact is so low that no real problems exist. This automatic determination of when a given instance of feature activation is not beneficial aspect of the automatic load-balancing invention weighs the potential benefit of the action against its consequences, and makes an intelligent decision for the user while preventing needless network disruption.

Intelligent Port-Distribution Algorithm

Automatic load-balancing moves end-nodes (or groups of end-nodes) after the system has been running to increase the overall throughput of the network. This aspect of the invention redistributes hub ports to segments with the goal of evenly balancing resource load across all of the known segments. Past history is used to anticipate the future load, i.e. history since either activation of the intelligent agent or since the last time the load-balancing feature itself was activated. The history can consist of the utilization on each port, communications patterns on the port, communications patterns on the segments, HP EASE data, RMON data, sampling data, or other intelligent considerations. Using the past history, this aspect of the invention moves ports to different segments to try to achieve the same network resource impact on all segments as much as possible or necessary. It should be appreciated that the load-balancing features in general could be applied to any number of segments, although four segments are used in the preferred embodiment of the invention. Additionally, the load-balancing features could also be implemented by an external software application rather than the embedded intelligent agent described in this embodiment.

A number of intelligent decisions, including which ports are to be moved, are incorporated into achieving a new load-balancing distribution. Many of these decisions further the goal of minimizing the number of ports moved from their current segment to a new segment. This is because such an action may cause a temporary disruption to any conversations which may be occurring between one or more of the moved end-nodes. These conversations occur at Open Systems Interconnection (OSI) layers higher than those with which hubs and switches concern themselves. The provision of a good distribution while minimizing the unnecessary moving of ports is one unique feature of the invention. The intelligent port distribution algorithm strives to achieve a very good network resource distribution across all segments while moving as few ports as possible. This feature of the invention includes assuring that all of the top resource-impacting end-nodes, i.e. the greatest users of the available network resources, are distributed across different segments. In addition, it accommodates situations where a particular segment may not be a good location upon which to place a particular port, i.e. it may not be fully qualified (e.g. when that segment is isolated from the multi-segment backplane on the device on which the port resides), and situations where the port should not be moved (e.g. when an external packet-forwarding device is connected to the port, or when a user or management application has designated the port not to be moved).

The herein disclosed algorithm first collects a snapshot of information about all of the ports to be considered for redistribution (automatically excluding ports which should not be moved). This information could include many network resource attributes (e.g. utilization, packets, broadcast/multicast packets, collisions, late collisions, etc.), but the presently preferred embodiment minimally notes:

Management repeater port identification value;
Management repeater previous segment identification value; and
Amount of port network resource impact since power-up or last load-balancing activation.

The preferred embodiment of the invention sorts this list of ports in descending order of network resource impact value. A list of segments on which to place the ports is also created. The algorithm proceeds, beginning with the port with the greatest network resource impact value and processing the ports in descending order. The goal is to try to keep as many ports as possible on their previous segments in an intelligent fashion, while still obtaining a good overall load-distribution.

Two such key areas of the current implementation are:
Detecting when further changes in port-to-segment assignments are not of sufficient benefit; and
Finding a well-chosen replacement port-segment assignment (if any) to use in place of each obvious pairing which the basic well-known selection algorithm (the "bin-packing" algorithm) would make.

The replacement assignments in the latter case must be in range of the basic selection algorithm's obvious port-segment assignment. For purpose of the discussion herein, in range means that the AlternatePort or AlternateSegment has some current decision-trigger value (for instance, individual port network resource impact value or segment total assigned network resource impact value) that is some deviationValue distance from the CandidatePort's or TargetSegment's value. The deviationValue could be a fixed value, a fixed percentage, the CandidatePort's percentage of the total network resource impact on all segments, or some other intelligent consideration.

Figure 4A:
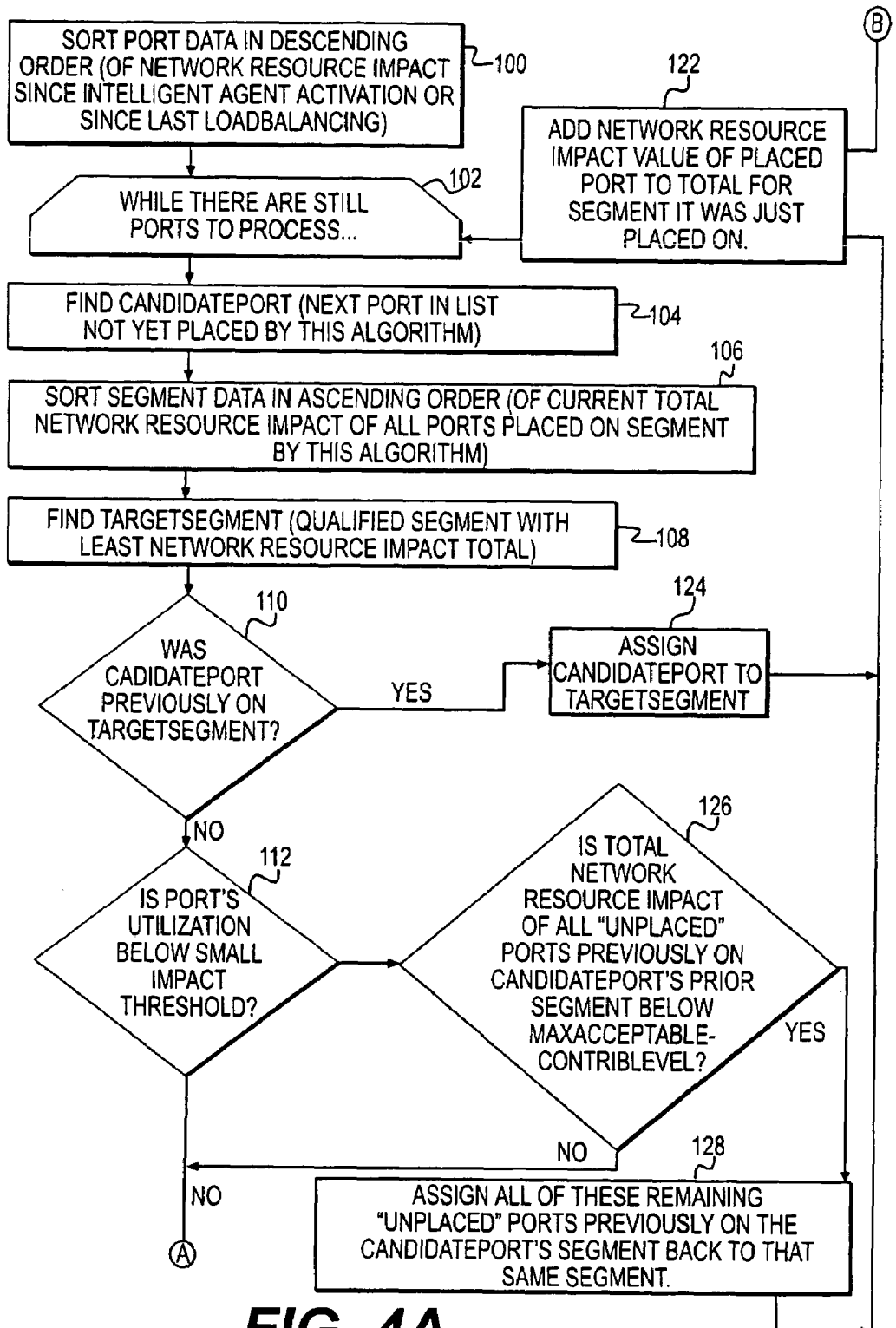
FIGS. 4A and 4B are flow diagrams showing a preferred implementation of an intelligent port distribution algorithm according to the invention.
Figure 4B:
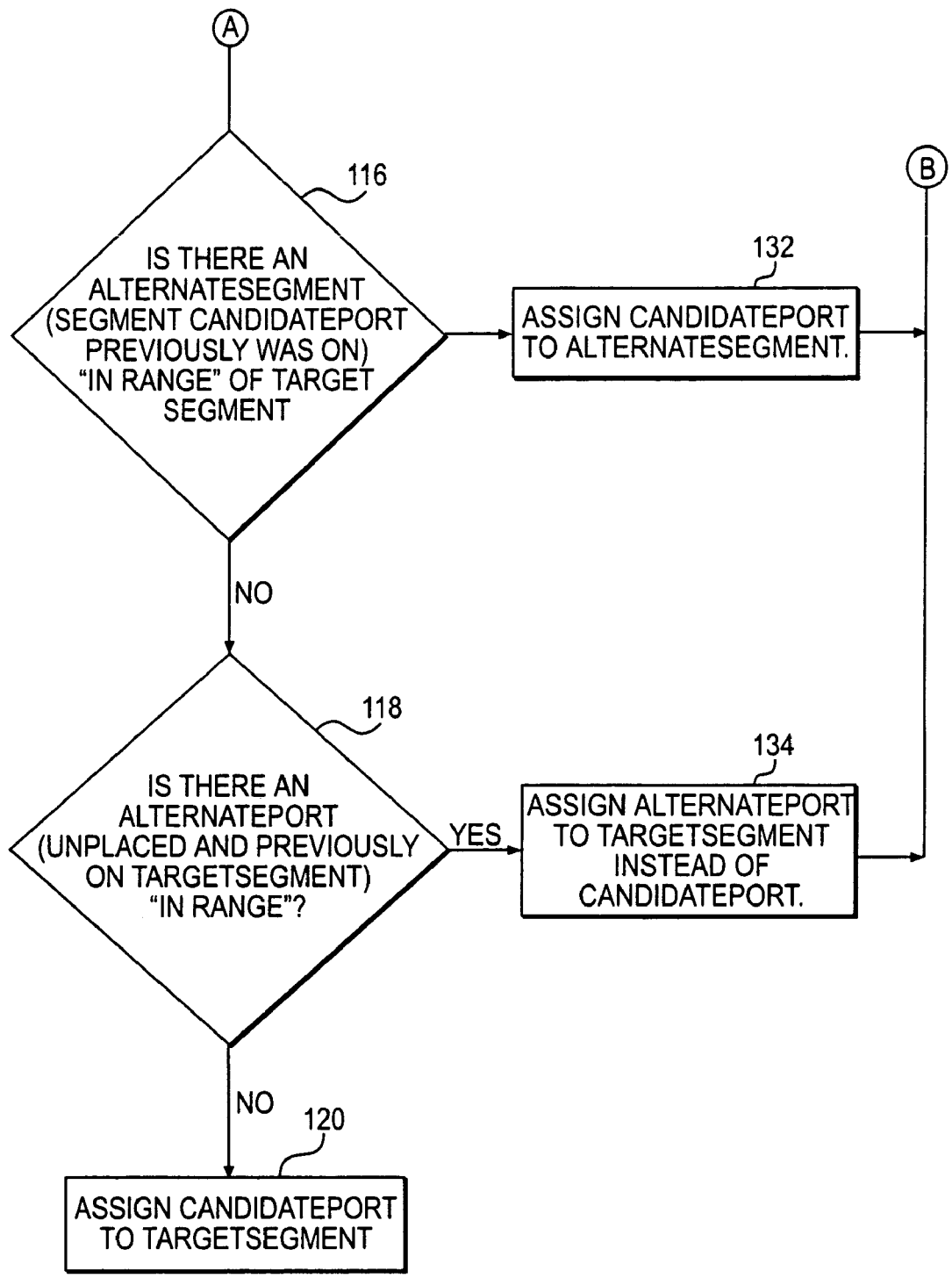

FIGS. 4A and 4B are flow diagrams showing a preferred implementation of an intelligent port distribution algorithm according to the invention. The following pseudo code listing explains the algorithm in connection with FIG. 4A and FIG. 4B.

```
{
        Find the next candidate port (104). This is the next port in the
sorted           list which has not already been marked as assigned
by this          algorithm.
        Sort the segments in ascending order (106) of current total of the
            network resource impact of all ports placed on them by the
            algorithm.
        Find the first segment with the least current network resource
impact           total that is fully qualified as the target segment for
the              CandidatePort (the restrictions for fully qualified vary
from one         implementation to another, but essentially indicate
that there         are no known adverse effects to putting the
given port on the          given segment).
            Make this the TargetSegment (108).
        Check if the CandidatePort was previously on the TargetSegment
            (110).
                If so, assign it back to that same segment (124)
                    and loop again above to process any
                    further ports (122,102).
        Check whether the CandidatePort's network resource impact
            value is below a certain low threshold value, the
            SmallImpact threshold (112).
                If so, check whether the total network resource impact
                    of all remaining unplaced ports that
                    previously were on the CandidatePort's same
                    segment is below another certain low
                    threshold value (126), the
                    MaxAcceptableContribLevel threshold.
                If so, further changes in segment assignments for
                    these particular ports is not of sufficient benefit.
                    Assign the CandidatePort and all of those
                    other ports back to their previous segment
                    (128) (this prevents moving small impacters
                    who are not really affecting that much of the
                    network's resources). Then loop again above
                    to continue processing the ports on other
                    segments (122, 102).
                If not, continue processing the CandidatePort.
        Check whether an AlternateSegment exists for the CandidatePort
            (116).
                If the segment the CandidatePort was previously on
                    is fully qualified with regard to the
                    CandidatePort and is in range of the
                    TargetSegment, an AlternateSegment exists.
                    Assign the CandidatePort to this
                    AlternateSegment (132) and loop again (122,
                    102) above to process any further ports.
        If none of the exceptions above were true, the TargetSegment is
            used.
        Look for an AlternatePort to assign to this TargetSegment in place
            of the CandidatePort. Proceeding in order through the list of
            sorted ports, check whether there is as yet a port not already
```

```
        placed by this algorithm that is in range to be used as an
        AlternatePort and for which the TargetSegment is fully
        qualified for placement (118).
               If an AlternatePort exists within range, assign it to the
                  TargetSegment instead of the CandidatePort
                  (134). Loop above again (122, 102), where
                  the next CandidatePort is the same port as for
                  this loop.
               If no AlternatePort exists within range, assign the
                  CandidatePort to the TargetSegment (120)
                  and loop above again (122, 102) to process
                  any further ports.
}
```

The use of intelligent checking for opportunities to assign ports back to the segments they were previously on minimizes needlessly moving ports, while at the same time obtaining a very good load for each segment. These intelligent checks are unique enhancements to the basic, well-known "bin-packing" selection algorithm.

Undo Prior Load-Balancing

With any user interface, there is the possibility of selecting and activating a feature by mistake. This is true whether the user interface is a simple text console or a more sophisticated mouse-driven Graphical User Interface (GUI).

If a user were to accidentally activate the automatic load-balancing feature, it would be very hard for them to later undo their mistake. This is because the same embedded intelligence that makes smart decisions on the user's behalf also hides information to keep from overwhelming the unsophisticated user. Even if the user did know the exact full port-to-segment configuration prior to activating the automatic load-balancing feature, it would be tedious for them to return the ports and segments to that configuration themselves. For example, in the current embodiment of the invention, hundreds of ports may be involved.

The undo prior load-balancing feature takes information stored at a prior load-balancing activation and uses it to return ports to that prior configuration. No action is taken on devices which were not known to the agent at the time of that prior load-balancing.

The automatic load-balancing invention offers several advantages, for example as follows:

First, it offers a decision-making process that provides intelligent automatic determination of when a given load-balancing activation currently would not be beneficial, thereby keeping the user's network from being unnecessarily disturbed when no real benefit would be gained. This user-friendly feature is enormously helpful to users who do not fully understand networks and who do not have any real sense of when network conditions do or do not suggest taking an action.

Second, it offers an undo prior load-balancing process when users have accidentally activated a feature which could substantially change their network configurations. This user-friendly feature saves users from their own mistakes, in a situation where it would otherwise be very hard for them to undo such a mistake.

The preferred embodiment of the invention provides one level of undo, although other embodiments of the invention could have many levels of undo. Each level of undo takes the user back to a next previous configuration, with the exception that newly added devices are not affected. The invention stores the previous configuration, but alternative embodiments of the invention could also provide the user with choices of default configurations, e.g. templates that provide configurations for different functions.

Third, it offers an extensive intelligent port-distribution algorithm that improves the network load by moving the right ports to new segments, while at the same time minimizing moving ports unnecessarily. With hundreds of possible ports to choose from in the maximum configuration allowed in the preferred embodiment of the invention, it would be tedious for even a sophisticated user to choose the right ports to move. Unsophisticated users do not have enough knowledge about how a network works to begin to know how to choose whether to move ports. This user-friendly feature benefits users who want better resource availability in their networks, but who lack the knowledge or the inclination to make changes themselves to improve this availability. Combined with the automatic determination of when a given instance of feature activation would not be beneficial, and the undo prior load-balancing features, it also lessens the possibility of users making choices that they may later regret.

Moreover, the intelligent port-distribution algorithm described herein merely requires multiple ports, and multiple segments to assign them to. It can be used when the intelligent network software agent does not have access to any packet-forwarding address table information. Although an internal packet-forwarding module is used in this embodiment of the invention, it should be clear that with additional information from other internal or external software mechanisms, or with minor configuration assistance from the user, other embodiments are possible in which the packet-forwarding device is external to the hub stack and the intelligent agent.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An automatic load-balancing apparatus for a segmented electronic network, comprising:
   an intelligent port-distribution mechanism that moves ports to new segments to accomplish load-balancing; and
   a detector that determines when load-balancing would not be beneficial by weighing potential benefit of an action against its consequences.

2. The apparatus of claim 1, said detector inhibiting load-balancing when a current load distribution is acceptable or when current network resource impact is so low that no real problems exist.

3. The apparatus of claim 2, wherein said detector makes an intelligent decision for a user while preventing needless network disruption.

4. The apparatus of claim 1, further comprising:
means for determining which ports are to be moved.

5. The apparatus of claim 1, wherein said apparatus is adapted for operation with a packet-forwarding device without requiring an interface to internal packet-forwarding support hardware.

6. The apparatus of claim 1, wherein said apparatus is adapted for operation with an external packet-forwarding device.

7. The apparatus of claim 1, wherein said apparatus is adapted for operation without special knowledge by a user of said apparatus, the apparatus environment, or electronic networks in general.

8. The apparatus of claim 1, wherein at least a portion of said mechanism is adapted to reside remote from said apparatus within said network at a management location.

9. An automatic load-balancing apparatus for a segmented electronic network, comprising:
an intelligent port-distribution mechanism that moves ports to new segments to accomplish load-balancing while minimizing the unnecessary moving of ports by keeping as many ports as possible on previous segments; and
an undo mechanism for undoing a prior load-balancing.

10. The apparatus of claim 9, wherein said undo mechanism takes information stored during a prior load-balancing activation and uses it to return ports to a previous configuration.

11. The apparatus of claim 10, wherein no action is taken by said undo mechanism on devices that were not known at the time of said prior load-balancing.

12. The apparatus of claim 10, wherein said undo mechanism provides one or more levels of undo.

13. The apparatus of claim 10, further comprising:
a detector for intelligent automatic determination of when a given load-balancing activation currently would not be beneficial.

14. The apparatus of claim 13, said detector inhibiting load-balancing when a current load distribution is acceptable or when current network resource impact is so low that no real problems exist.

15. The apparatus of claim 14, wherein said detector weighs potential benefit of an action against its consequences, and makes an intelligent decision for a user while preventing needless network disruption.

16. The apparatus of claim 9, further comprising:
means for determining which ports are to be moved.

17. The apparatus of claim 9, wherein said apparatus is adapted for operation with a packet-forwarding device without requiring an interface to internal packet-forwarding support hardware.

18. The apparatus of claim 9, wherein said apparatus is adapted for operation with an external packet-forwarding device.

19. The apparatus of claim 9, wherein said apparatus is adapted for operation without special knowledge by a user of said apparatus, the apparatus environment, or electronic networks in general.

20. The apparatus of claim 9, wherein at least a portion of said mechanism is adapted to reside remote from said apparatus within said network at a management location.

21. An automatic load-balancing apparatus for a segmented electronic network, comprising:
an intelligent port-distribution mechanism that moves ports to new segments to accomplish load-balancing, wherein the mechanism weighs potential benefit of an action against its consequences.

22. The apparatus of claim 21, wherein said mechanism first collects a snapshot of information about all network ports to be considered for redistribution.

23. The apparatus of claim 22, wherein said snapshot further comprises any of the following:
a management repeater port identification value;
a management repeater previous segment identification value; and
an amount of port network resource impact since power-up or last load-balancing activation.

24. The apparatus of claim 22, wherein said mechanism makes an intelligent decision for a user while preventing needless network disruption.

25. The apparatus of claim 22, wherein said mechanism keeps as many ports as possible on a previous segment while still obtaining a good overall load-distribution.

26. The apparatus of claim 22, wherein said mechanism detects when further changes in port-to-segment assignments is not of benefit.

27. The apparatus of claim 22, wherein said mechanism finds a replacement port-segment assignment in range of, and uses in place of, a pairing that would be chosen by a basic "bin-packing" selection criteria for port-segment assignment.

28. The apparatus of claim 27, wherein an assignment is in range when an alternate port or alternate segment has a current decision-trigger value that is a deviation value distance from a candidate port or target segment value.

29. The apparatus of claim 28, wherein said deviation value comprises one or more of the following:
a fixed value;
a fixed percentage;
a candidate port percentage of total decision criteria value on all segments;
an individual port decision criteria value; or
a segment total assigned decision criteria value.

30. The apparatus of claim 21, further comprising:
means for determining which ports are to be moved.

31. The apparatus of claim 21, wherein said apparatus is adapted for operation with a packet-forwarding device without requiring an interface to internal packet-forwarding support hardware.

32. The apparatus of claim 21, wherein said apparatus is adapted for operation with an external packet-forwarding device.

33. The apparatus of claim 21, wherein said apparatus is adapted for operation without special knowledge by a user of said apparatus, the apparatus environment, or electronic networks in general.

34. The apparatus of claim 21, wherein at least a portion of said mechanism is adapted to reside remote from said apparatus within said network at a management location.

35. An automatic load-balancing method for a segmented electronic network, comprising the steps of:
providing an intelligent port-distribution mechanism that moves ports to new segments to accomplish load-balancing; and determining when load-balancing would not be beneficial by weighing potential benefit of an action against its consequences.

36. The method of claim 35, further comprising the step of:
inhibiting load-balancing when a current load distribution is acceptable or when current network resource impact is so low that no real problems exist.

37. The method of claim 36, further comprising
making an intelligent decision for a user while preventing needless network disruption.

38. The method of claim 35, further comprising the step of:
determining which ports are to be moved.

39. The method of claim 35, wherein said method is adapted for operation with a packet-forwarding device without requiring an interface to internal packet-forwarding support hardware.

40. The method of claim 35, wherein said method is adapted for operation with an external packet-forwarding device.

41. The method of claim 35, wherein said method is adapted for operation without special knowledge by a user of said method, the method environment, or electronic networks in general.

42. The method of claim 35, wherein at least a portion of said mechanism is adapted to reside remote from devices upon which said method operates within said network at a management location.

43. An automatic load-balancing method for a segmented electronic network, comprising the steps of:
providing an intelligent port-distribution mechanism that moves ports to new segments to accomplish load-balancing while minimizing the unnecessary moving of ports by keeping as many ports as possible on previous segments; and
providing a mechanism for undoing a prior load-balancing.

44. The method of claim 43, further comprising the steps of:
taking information stored during a prior load-balancing activation; and
using such information to return ports to a previous configuration.

45. The method of claim 44, wherein no action is taken by said undo mechanism on devices that were not known at the time of said prior load-balancing.

46. The method of claim 44, wherein said undo mechanism provides one or more levels of undo.

47. The method of claim 44, further comprising the step of:
determining when a given load-balancing activation currently would not be beneficial.

48. The method of claim 47, further comprising the step of:
inhibiting load-balancing when a current load distribution is acceptable or when current network resource impact is so low that no real problems exist.

49. The method of claim 48, further comprising the steps of:
weighing potential benefit of an action against its consequences; and
making an intelligent decision for a user while preventing needless network disruption.

50. The method of claim 43, further comprising the step of:
determining which ports are to be moved.

51. The method of claim 43, wherein said method is adapted for operation with a packet-forwarding device without requiring an interface to internal packet-forwarding support hardware.

52. The method of claim 43, wherein said method is adapted for operation with an external packet-forwarding device.

53. The method of claim 43, wherein said method is adapted for operation without special knowledge by a user of said method, the method environment, or electronic networks in general.

54. The method of claim 43, wherein at least a portion of said mechanism is adapted to reside remote from devices upon which said method operates within said network at a management location.

55. An automatic load-balancing method for a segmented electronic network, comprising the steps of:
providing an intelligent port-distribution mechanism; and
moving, using the port-distribution mechanism, ports to new segments to accomplish load-balancing, wherein the mechanism weighs potential benefit of an action against its consequences.

56. The method of claim 55, further comprising the step of:
collecting a snapshot of information about all network ports to be considered for redistribution.

57. The method of claim 56, wherein said snapshot comprises any of the following:
a management repeater port identification value;
a management repeater previous segment identification value; and
an amount of port network resource impact since power-up or last load-balancing activation.

58. The method of claim 55, further comprising
making an intelligent decision for a user while preventing needless network disruption.

59. The method of claim 55, further comprising the step of:
keeping as many ports as possible on a previous segment while still obtaining a good overall load-distribution.

60. The method of claim 55, further comprising the step of:
detecting when further changes in port-to-segment assignments is not of benefit.

61. The method of claim 55, further comprising the step of:
finding a replacement port-segment assignment in range of, and using in place of, a pairing arising from basic selection criteria for port-segment assignment.

62. The method of claim 61, further comprising the step of:
determining that an assignment is in range when an alternate port or alternate segment has a current decision-trigger value that is a deviation-value distance from a candidate port or target segment value.

63. The method of claim 62, wherein said deviation-value comprises one or more of the following:
a fixed value;
a fixed percentage;
a candidate port percentage of total decision criteria value on all segments;
an individual port decision criteria value; or
a segment total assigned decision criteria value.

64. The method of claim 55, further comprising the step of:

determining which ports are to be moved.

65. The method of claim 55, wherein said method is adapted for operation with a packet-forwarding device without requiring an interface to internal packet-forwarding support hardware.

66. The method of claim 55, wherein said method is adapted for operation with an external packet-forwarding device.

67. The method of claim 55, wherein said method is adapted for operation without special knowledge by a user of said method, the method environment, or electronic networks in general.

68. The method of claim 55, wherein at least a portion of said mechanism is adapted to reside remote from devices upon which said method operates within said network at a management location.

69. An intelligent port-distribution method that moves ports to new segments to accomplish load-balancing in a segmented electronic network, comprising the steps of:

collecting a snapshot of information about all network ports to be considered for redistribution;

sorting said ports in descending order of network resource impact value;

finding the next candidate port which is the next port among said sorted ports that has not already been assigned; sorting segments in ascending order of current total of network resource impact of all ports placed on them;

finding the first segment with a least current network resource impact total that is fully qualified as the target segment for a candidate port;

checking if said candidate port was previously on the target segment and, if so, assigning said candidate port back to that same segment; and processing any further ports.

70. The method of claim 69, further comprising the steps of:

checking whether a candidate port decision criteria value is below a predetermined low threshold value and, if so, checking whether a total network resource impact of all remaining unplaced ports that previously were on said candidate port's same segment is below a maximum acceptable contribution level threshold and, if so, then determining that further changes in port-to-segment assignments is not of sufficient benefit;

assigning said candidate port and all of said other ports back to that previous segment; and continuing processing said ports on other segments and, if not, continuing processing said candidate port.

71. The method of claim 70, further comprising the steps of:

checking whether an alternate segment exists for said candidate port and, if the segment that said candidate port was previously on is fully qualified with regard to said candidate port and is in range of said target segment, then determining that an alternate segment exists;

assigning said candidate port to said alternate segment;

processing any further ports; and using said target segment if no exception is true.

72. The method of claim 71, further comprising the steps of:

looking for an alternate port to assign to said target segment in place of said candidate port;

proceeding in order through said list of sorted ports;

checking whether there is a port that is not already placed, but that is in range, and that previously resided on said target segment, which can be used as an alternate port, and for which said target segment is fully qualified for placement and, if an alternate port exists within range;

assigning said port to said target segment instead of said candidate port; and processing any further ports, and if no alternate port exists within range, assigning said candidate port to said target segment; and processing any further ports.

73. The method of claim 69, further comprising the step of:

determining which ports are to be moved.

74. The method of claim 69, wherein said method is adapted for operation with a packet-forwarding device without requiring an interface to internal packet-forwarding support hardware.

75. The method of claim 69, wherein said method is adapted for operation with an external packet-forwarding device.

76. The method of claim 69, wherein said method is adapted for operation without special knowledge by a user of said method, the method environment, or electronic networks in general.

77. The method of claim 69, wherein at least a portion of said mechanism is adapted to reside remote from devices upon which said method operates within said network at a management location.

78. A method for moving ports to new segments in a network for load balancing, comprising:

collecting information about the ports and segments in the network, the information including network resource impact value; and assigning ports to new segments based on the information while minimizing the unnecessary moving of ports by keeping as many ports as possible on previous segments.

79. The method of claim 78, wherein collecting information about the ports and segments includes collecting network resource impact values for the ports.

80. The method of claim 78, wherein collecting information about the ports and segments includes collecting total network resource impact values for segments.

81. The method of claim 78, wherein assigning ports to new segments includes assigning ports based on past history of the ports.

82. The method of claim 78, further comprising:

determining which of the ports are to be moved.

83. The method of claim 78, further comprising:

determining when load balancing would not be beneficial.

84. The method of claim 78, further comprising:

undoing a previous assignment of the ports to new segments.

\* \* \* \* \*